United States Patent
Asplund

[11] 3,754,766
[45] Aug. 28, 1973

[54] SPRING TYPE RING SEAL
[75] Inventor: Herbert F. Asplund, South Windsor, Conn.
[73] Assignee: United Aircraft Corporation, East Hartford, Conn.
[22] Filed: Nov. 11, 1971
[21] Appl. No.: 197,799

[52] U.S. Cl. .................................. 277/236, 415/172
[51] Int. Cl. ............................................ F16j 15/38
[58] Field of Search .................. 277/236, 235 B, 95, 277/96, 58, 59; 415/172

[56] References Cited
UNITED STATES PATENTS
3,537,733    11/1970    Martin ................................ 277/236
FOREIGN PATENTS OR APPLICATIONS
518,460    2/1940    Great Britain ...................... 277/236

Primary Examiner—Samuel B. Rothberg
Assistant Examiner—Robert L. Smith
Attorney—Charles A. Warren

[57] ABSTRACT

A seal is provided between two oppositely directed cooperating surfaces to prevent the radial leakage of fluid between the surfaces, the seal comprising a ring disposed between the surfaces, the ring including a truncated conical mid-section having a substantially axially extending outwardly directed flange at each end. The ring is able to accommodate relative axial movement between the surfaces by rotation about a circumferential center line located approximately midway of the conical mid-section. This mode of compression reduces bending stresses in the ring. Two of these rings can be used in combination to provide a passageway for carrying fluid across the axial gap between the cooperating surfaces.

3 Claims, 5 Drawing Figures

Patented Aug. 28, 1973 3,754,766

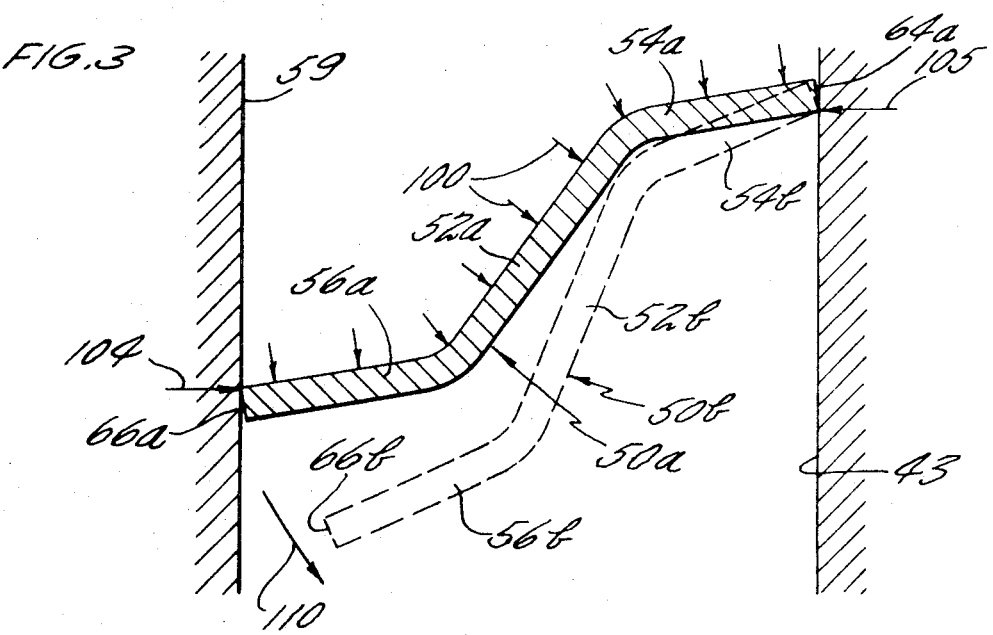
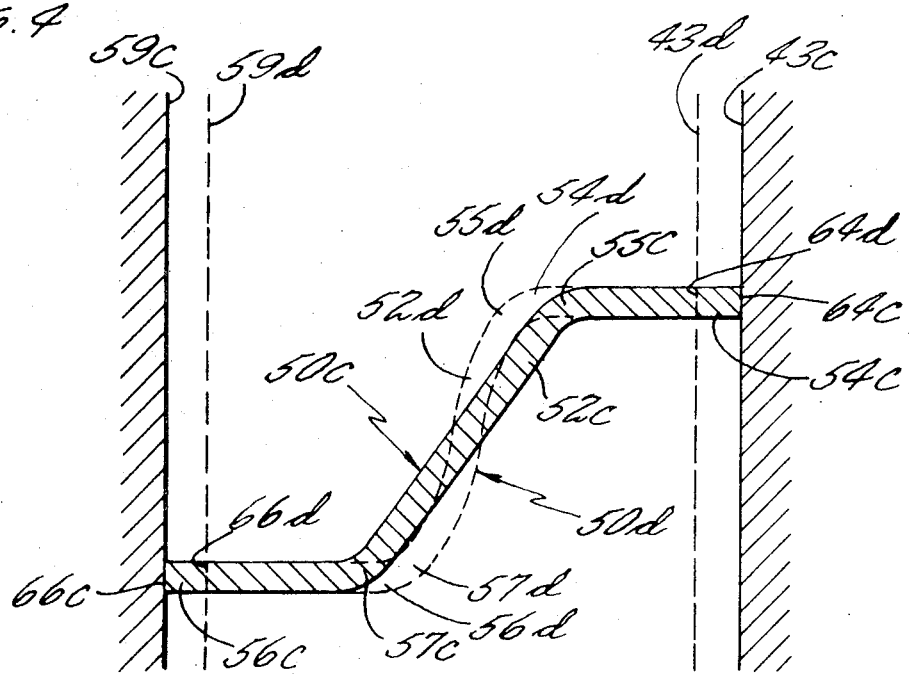

SPRING TYPE RING SEAL

The invention herein described was made in the course of or under a contract with the Department of the Navy.

BACKGROUND OF THE INVENTION

1. Field of Invention

This invention relates generally to sealing devices and more particularly to seals between oppositely directed cooperating surfaces.

2. Description of the Prior Art

A situation often arising is the need to prevent radial leakage of fluid between oppositely directed radially extending cooperating surfaces which may move axially and radially with respect to each other. An O-ring seal is one well known type of seal for preventing such leakage. O-rings, however, are often temperature limited and cannot accommodate more than a small axial movement between the surfaces. A piston ring, in combination with, for example, a wave spring, to provide an axial movement capability to the piston ring, may also be used and does not have these limitations; however, because piston rings normally seal on a diameter they require a high degree of concentricity and roundness between all the sealing surfaces making the piston ring seal difficult and expensive to manufacture. These problems become more acute as the sealing diameters become larger because the piston ring and its associated parts are more flexible at large diameters and are thus prone to increased distortion from external loads. Some environments, such as in the turbine section of a gas turbine engine, also subject these seals to high temperature gradients creating additional distortion. The use of undesirably heavy parts may be required to reduce this distortion to acceptable levels. Waite U.S. Pat. No. 3,012,802, shows a seal with a W-shaped cross-section. At first impression, a seal of this general shape appears to have application in such an environment. However, a closer analysis will show that a W-shaped seal is very stiff. When compressed, bending stresses increase rapidly. For large deflections the seal stiffness may be reduced by using extremely thin sheet stock; however, the seal may then leak when only slightly deflected. By making the seal very large in its axial and/or radial dimension this problem can be solved. This solution, however, is often unacceptable.

It is sometimes desired to carry fluid across the gap between the two cooperating surfaces. However, due to relative axial and radial movement between these surfaces, complicated expensive hardware would normally be needed to accomplish such an objective.

SUMMARY OF THE INVENTION

Accordingly, it is an object of the present invention to provide a seal to prevent radial leakage of fluid between two oppositely directed cooperating surfaces.

It is another object of the present invention to provide a seal to prevent the radial leakage of fluid between two oppositely directed cooperating surfaces which may move axially and radially with respect to each other.

It is a further object of the present invention to provide a seal for preventing the radial leakage of fluid between oppositely directed cooperating surfaces while carrying a second fluid across the axial gap between said surfaces, said surfaces being able to move axially and radially with respect to each other.

According to the present invention, a seal is provided comprising a ring having a truncated conical mid-section with a substantially axially extending outwardly directed flange at each end thereof. The seal is adapted to be disposed between two oppositely directed substantially radially extending cooperating surfaces, said surfaces being spaced apart a distance somewhat less than the free axial length of the seal thereby compressing the seal in an axial direction.

The seal can be designed for a variety of situations, but is particularly adapted for sealing within narrow radial spaces, at large diameters and for accommodating large axial and radial relative movement between the cooperating surfaces. Stiffness is provided by the substantially axially directed flanges at each end of the ring, while resiliency and flexibility is provided by the conical mid-section. A seal in accordance with the present invention accommodates most of the axial movement between said surfaces by a rotation of the seal about a circumferential center line located approximately midway of the conical mid-section rather than by a pure axial motion of the flanges. This results in very little bending where the flanges join the conical mid-section, keeping stresses in these joints at a low level. Radial movement between the cooperating surfaces is taken by a sliding of said surfaces against the ends of the ring.

In accordance with the further object of the present invention, a seal is provided comprising two rings, each having a configuration similar to the ring hereinabove described. The rings are disposed between two oppositely directed substantially radially extending cooperating surfaces and are concentric to one another forming an annular chamber between said surfaces and said rings. By providing openings in said surfaces, the openings communicating with said chamber, said chamber may be used as a passageway for carrying a flow of fluid across the axial gap between said surfaces. The simplicity of this technique is a major advantage over the prior art.

The foregoing and other objects, features and advantages of the present invention will become more apparent in the light of the following detailed description of the preferred embodiments thereof as illustrated in the accompanying drawings.

BRIEF DESCRIPTION OF THE DRAWINGS

FIGS. 3 and 4 are illustrative sectional views showing potential problems in the design of a seal of the type disclosed herein.

DESCRIPTION OF THE PREFERRED EMBODIMENTS

Figure 1:
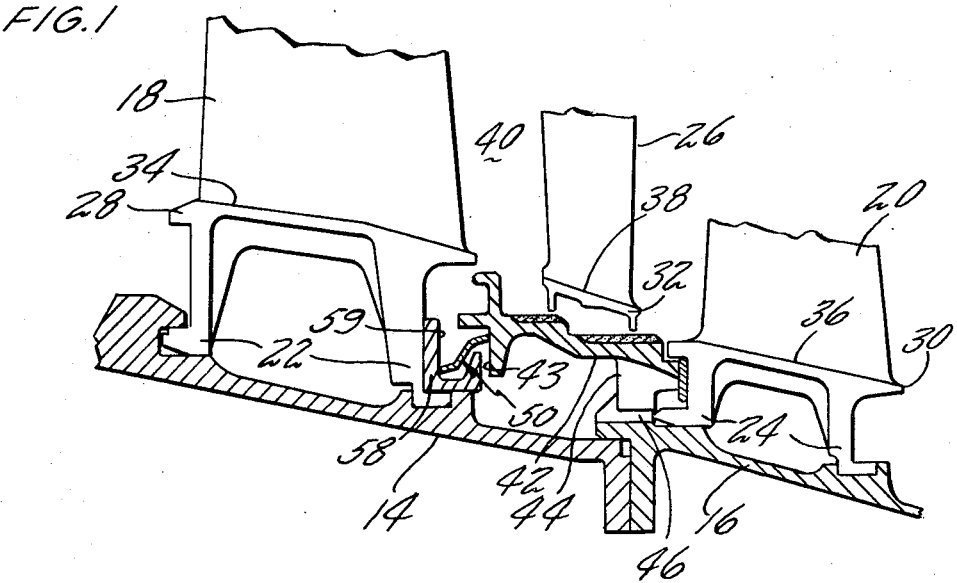
FIG. 1 is a partly sectioned, partial elevation view of a portion of a turbine section of a gas turbine engine embodying the invention.

Referring to FIG. 1, the illustrated portion of a turbine section in this preferred embodiment comprises upstream and downstream outer turbine cases 14, 16, respectively, providing support for a row of second and third stage turbine vanes 18, 20, respectively at their outer ends 22, 24, respectively, as shown. The turbine section also comprises a row of turbine blades 26 which are supported at their inner ends (not shown) by a rotor hub (not shown). Each turbine vane 18, 20 and turbine blade 26 includes a shroud 28, 30, 32, respectively, having an inner surface 34, 36, 38, respectively, defining the outer wall of a turbine gas path 40. A turbine shroud ring 42, having a radially extending surface 43 at its upstream end, is provided to minimize the leakage of gas path air around the outer ends of the turbine blades 26. The shroud ring 42 is provided with a spline 44 which engages a spline 46 on the downstream turbine case 16. This spline connection permits both radial and axial movement of the shroud ring relative to the turbine case while maintaining concentricity of the ring 42 with respect to the engine center line. A vane lock ring 58 is positioned downstream and adjacent the outer ends of the vanes 20 and includes an annular groove 60 a radially inwardly extending lip 62, and a radially extending surface 59, oppositely directed from and cooperating with the surface 43.

Figure 2:
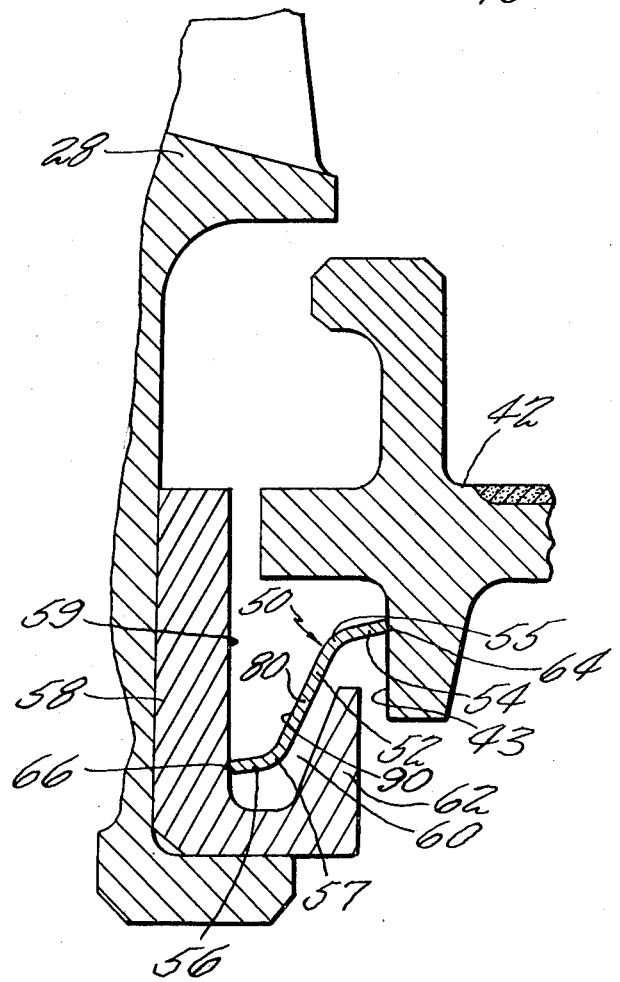
FIG. 2 is an enlarged sectional view, particularly illustrating the invention.

A seal 50 in accordance with the present invention is best shown in FIG. 2. The seal 50 is a ring comprising a truncated conical mid-section 52 having a downstream and upstream end 55, 57, respectively, and including a cylindrical flange 54 at its downstream end 55 extending in a downstream direction and a cylindrical flange 56 at its upstream end 57 extending in an upstream direction. The seal 50 is fed into the groove 60 which holds the seal during assembly and radially locates the seal. The lip 62 assures proper installation of the seal. A tight seal at the ends 64, 66 of the flanges 54, 56 is provided by having the axial length of the seal greater than the axial distance between the cooperating surfaces 43, 59 at all times. The radial pressure drop which can be accommodated across the seal 50 without leakage around its ends 64, 66 is directly proportional to the stiffness of the seal and the amount of compression it undergoes. During engine operation, when the turbine section is subjected to high temperatures, axial thermal growth of the shroud ring 42 toward the lock ring 58 is quite significant. Also, to install the third stage vanes 20 (FIG. 1) the seal ring 42 must be moved upstream temporarily, compressing the seal 50 during assembly. In this preferred embodiment compression of the seal during assembly is actually larger than compression of the seal at high temperatures during engine operation.

As stated, the ability of the seal to prevent the radial leakage of fluid around its ends depends on the stiffness or spring rate of the seal in an axial direction and the amount of axial compression. The spring rate of the seal is dependent upon several factors. If the conical midsection 52 of the seal did not have cylindrical flanges 54, 56 at its ends 55, 57 the seal would have a relatively low axial spring rate. That is, the ends 55, 57 would be easily moved by an axial load. Adding cylindrical flanges 54, 56 provides stiffness by impeding the radial movement of the mid-section ends 55, 57. It is also important to realize that the axial spring rate of a truncated conical ring increases as it approaches a cylinder. By proper choice of the cone angle of the mid-section 52 and the lengths of the flanges 54, 56, the seal, as it is compressed, will rotate about a circumferential center line passing through a point 80, approximately midway of the conical mid-section. As a result of this rotation, bending where the conical mid-section joins the flanges is minimized. This is the mechanism by which stresses in this seal are kept to a minimum. The seal 50 in FIG. 2 is shown in a compressed rotated position. In addition to the above considerations, other well-known teachings of the prior art should be employed in choosing materials and dimensions to assure the integrity of the seal at all times.

FIG. 3 illustrates what may occur if the spring rate of the seal is too low. Similar parts are given the same reference numerals as used in FIGS. 1 and 2 except that the reference numerals are followed by small letters *a* and *b* to distinguish between the two modes of the seal shown in FIG. 3. The arrows 100 represent the net pressure load on the seal. The arrows 104, 105 represent the axial loads on the ends 66a, 64a, respectively. The axial component of the net pressure load 100 acts in a downstream direction and is opposed by an axial spring force which tends to return the seal to its free state. If this spring force is insufficient to overcome the net axial pressure load, that is, if the seal has too low a spring rate, the end 66a of the upstream flange 56a will lift away from the wall to a position as shown by the dotted lines. Leakage, as represented by the arrow 110, can now occur around the end 66b.

FIG. 4 shows what occurs when the spring rate of the cylindrical flange compared to the conical flange is too high. Once again the same reference numerals as used in FIGS. 1 and 2 are used in FIG. 4. The small letters *c* and *d* following the reference numerals distinguish between the two modes of the seal as shown in FIG. 4. As the flanges 54c, 56c become longer the ends 55c, 57c of the mid-section become more resistant to radial movement. If the flanges are too long, the ends 55c, 57c will not move radially to any significant extent. Compression of the seal will therefore be taken by an essentially pure axial movement of the flanges, as shown by the phantom lines, resulting in increased bending at the ends 55d, 57d of the conical mid-section 52d where the mid-section joins the flanges. If this mode of bending takes place permanent deformation of the ring is more likely to occur.

The simplicity of this seal and its ability to be designed to seal against large pressure gradients and to take large amounts of axial compression at large diameters and over a wide range of temperatures gives it many advantages over seals known in the art. In a typical operation of an engine incorporating an embodiment of the invention which performed satisfactorily, the maximum steady state temperature to which the seal is subjected may be 1,400° F. At this temperature, the seal may be compressed by amounts ranging from 0.013 inches to 0.045 inches with neither leakage nor overstressing occurring. The radial pressure drop across the seal under this condition may be on the order of 28 psi, the higher pressure always being on the gas path side 90 (FIG. 2) of the seal 50. During assembly of the engine, the seal may be compressed about 0.051 inches. Under these conditions, a seal made from 0.0165 inch sheet stock of a typical high strength, oxidation resistant steel such as AMS 5544 is suitable. The axial free length of the seal is about 0.24 inch. The upstream and downstream cylindrical flanges 54, 56 are both approximately 0.073 inch long and have outer diameters of approximately 25.54 inches and 25.22 inches, respectively.

Figure 5:
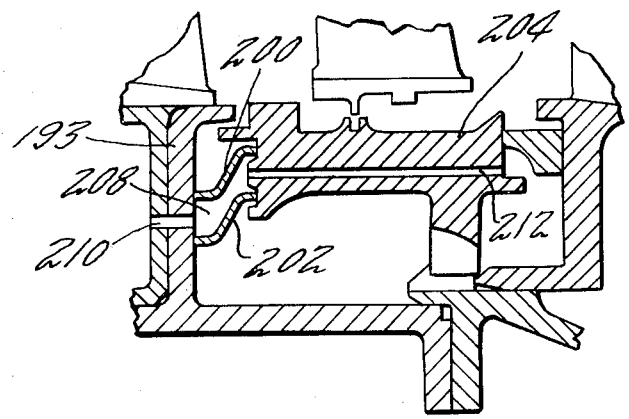
FIG. 5 is a partly sectioned, partial elevation view of a turbine section of a gas turbine engine employing an alternate embodiment of the invention.

In an alternate embodiment of this invention, as shown in FIG. 5, two seals 200, 202 are used. Each of these seals is similar in size and shape to the seal 50 hereinbefore shown and described in FIGS. 1 and 2. As here shown, the lock ring 58 (FIGS. 1 and 2) has been replaced with a radially extending projection 193 from the turbine casing. The seals 200, 202 are disposed between the projection 193 and outer air seal ring 204 forming an annular chamber 208. The projection 193 and the seal ring 204 are each provided with a plurality of circumferentially spaced axially extending passageways 210, 212, respectively, communicating with the chamber 208. Cool air is received into the chamber 208 from the passageways 210 and exits from the chamber 208 by means of the passageways 212, cooling the air seal ring 204 as it passes therethrough. It should be noted that the pressure drop across the seals in this embodiment may be in either direction depending on the pressure in chamber 208.

Although the invention has been shown and described with respect to preferred embodiments thereof, it should be understood by those skilled in the art that the foregoing and various other changes and omissions in the form and detail thereof may be made therein without departing from the spirit and the scope of the invention.

Having thus described typical embodiments of my invention, that which I claim as new and desire to secure by Letters Patent of the United States is:

1. A seal assembly comprising:
a first ring having a radially extending flat surface, a second ring axially spaced from said first ring and having a radially extending flat surface facing and cooperating with said surface of said first ring, said cooperating surfaces having a radial pressure gradient therebetween and able to move axially and radially relative to each other, a seal ring disposed between said cooperating surfaces, said seal ring comprising a truncated conical mid-section having an integral outwardly directed cylindrical flange at each end thereof, the free axial length of said seal ring being greater than the axial distance between said cooperating surfaces, the free ends of said flanges abutting said cooperating surfaces, the radially innermost end being free to slide radially inwardly on its abutting surface and the radially outermost end being free to slide radially outwardly on its abutting surface the material and dimensions of said seal ring being chosen such that the stiffness of the seal ring allows axial compression of said seal ring to occur by a radial sliding motion of said ends on said surfaces in combination with a rotation of said mid-section whereby bending at the junction of the mid-section and the flanges is reduced.

2. A seal assembly comprising:
a first ring having a radially extending flat surface, a second ring axially spaced from said first ring and having a radially extending flat surface facing and cooperating with said surface of said first ring, said cooperating surfacee having a radial pressure gradient therebetween, a first seal ring and a second seal ring disposed between said cooperating surfaces, said first seal ring and said second seal ring being concentric forming an annulus therebetween, each of said seal rings comprising a truncated conical mid-section having an integral outwardly directed flange at each end thereof, the free axial length of each seal ring being greater than the axial distance between said cooperating surfaces, and the material and dimensions of said rings being chosen such that the stiffness of said rings allows axial compression of said rings to occur by a radial sliding motion of said flanges against said surfaces in combination with a rotation of said mid-section whereby bending at the junction of the mid-section and the flanges is reduced, each of said cooperating surfaces having an opening therein communicating with said annulus for providing a flow of fluid through said annulus across the axial gap between said surfaces.

3. A seal assembly for the turbine section of a gas turbine engine having an outer turbine casing, a row of stator vanes supported by the casing, and a row of rotor blades adjacent the stator vanes, said seal assembly comprising:
a first ring located within the casing and connected thereto by means permitting relative radial and axial movement therebetween, said first ring surrounding the rotor blades and having a radially extending flat surface disposed about the engine centerline;
a second ring disposed between the stator vanes and said first ring and having a radially extending flat surface disposed about the engine centerline, facing and cooperating with said radially extending flat surface on said first ring, said cooperating surfaces having a radial pressure gradient therebetween and able to move axially and radially relative to each other; and
a seal ring disposed about the engine centerline and between said cooperating surfaces, said seal ring comprising a truncated conical mid-section having an integral outwardly directed cylindrical flange at each end thereof, the free axial length of said seal ring being greater than the axial distance between said cooperating surfaces, the free ends of said flanges abutting said cooperating surfaces, the radially innermost end being free to slide radially inwardly on its abutting surface and the radially outermost end being free to slide radially outwardly on its abutting surface, the material and dimensions of said seal ring being chosen such that the stiffness of the seal ring allows axial compression of said seal ring to occur by a radial sliding motion of said ends on said surfaces in combination with a rotation of said mid-section whereby bending at the junction of the mid-section and the flanges is reduced.

* * * * *